United States Patent [19]
Falkehag et al.

[11] 3,870,681
[45] Mar. 11, 1975

[54] MOFIEFIED SULFONATED RESIN SURFACTANTS

[75] Inventors: Sten I. Falkehag, Mount Pleasant; Carl W. Bailey, III, Charleston, both of S.C.

[73] Assignee: Westvaco Corporation, New York, N.Y.

[22] Filed: Feb. 20, 1973

[21] Appl. No.: 333,995

[52] U.S. Cl............ 260/49, 8/93, 252/353, 260/29.3, 260/30.8 R, 260/47 EP, 260/59 R
[51] Int. Cl............ C08g 5/02, C08g 5/18
[58] Field of Search........ 260/49, 59 R, 47 EP

[56] References Cited
UNITED STATES PATENTS

| | | | |
|---|---|---|---|
| 3,065,039 | 11/1962 | Komarek et al. | 8/94.24 |
| 3,108,087 | 10/1963 | Kirkpatrick et al. | 260/44 |
| 3,230,197 | 1/1966 | Adolphson | 260/49 |
| 3,442,859 | 5/1969 | Lipowski et al. | 260/49 |
| 3,677,979 | 7/1972 | Beaulieu | 260/2.2 |

Primary Examiner—Lester L. Lee
Attorney, Agent, or Firm—Richard L. Schmalz; Ernest B. Lipscomb, III

[57] ABSTRACT

The surfactants of this invention are phenolic-formaldehyde resins that have been sulfomethylated with from 1–13 moles of sulfomethylation per 1000 grams of the starting resin and further modified by reaction with up to 20 moles, preferably 0.25 to 10 moles, per 1,000 grams of starting resin of a blocking agent of the type $X(CHR)_m(CH_2)_nY$, wherein X is a halogen, an activated double bond, epoxy ring or halohydrin, Y is a property group such as sulfonate, phosphonate, carboxylate or hydroxyl, R is another property group such as hydrogen, hydroxyl, mercaptan or amine, and $n$ and $m$ are integers from 0 to 5, with $n$ to $m$ being at least 1, to at least partially block the phenolic hydroxy group of the resin. The phenolic-formaldehyde resin may also be cross-linked to tailor its molecular weight and then treated with urea or ammonia, if desired.

15 Claims, No Drawings

MODIFIED SULFONATED RESIN SURFACTANTS

BACKGROUND OF THE INVENTION

1. Field of the Invention

This invention relates to modified phenolic-formaldehyde resin surfactants. More specifically, this invention relates to modified phenolicformaldehyde resin surfactants that have been further modified by blocking of the phenolic hydroxyl groups. Additionally, this invention relates to the use of these surfactants as dispersants in dyestuffs.

2. The Prior Art

Phenolic resins have found widespread use in numerous areas, in particular, molded and cast plastic articles, adhesives for plywood as laminating resins and in thermal insulation to name a few. Because these resins are versatile and inexpensive, numerous reactants have been used to modify the resins in order to improve certain properties, for example, dispersing ability, or to inhibit a property that is undesirable for certain uses.

By way of illustration of modifying phenolic-formaldehyde resins the following patents are cited. U.S. Pat. No. 3,065,039 to E. Komarek et al. describes sulfomethylating a phenol-formaldehyde resin and its use as a synthetic tanning agent. U.S. Pat. No. 2,076,624 to M. DeGroote is directed to a process for breaking emulsions with phenol resins that have been reacted with alkylene oxides. U.S. Pat. No. 2,658,885 to G. F. D'Alelio describes soluble copolymers of epoxyalkoxy hydrocarbon-substituted phenol-aldehyde resins useful in cements, impregnates, coatings, etc. U.S. Pat. No. 3,606,988 to K. Walz et al. teaches a process for dyeing nitrogen-containing fibers in the presence of a dyeing auxiliary consisting of the reaction product of an alkylene oxide and the condensation product of a phenolic compound, formaldehyde and an amine. The art cited is meant to show the state of the art and is not intended to be all inclusive of phenolic modifications or their uses.

It is therefore the general object of this invention to produce a -sulfomethylated phenolic-formaldehyde resin in which some or all of the free phenolic hydroxyl groups are blocked. Another object of this invention is to produce a modified phenolic-formaldehyde resin useful as a surfactant. Still another object of this invention is to provide a dyestuff composition containing a sulfomethylated phenolic-formaldehyde resin having some or all free hydroxyl groups blocked as a dispersing agent.

Further objects, features and advantages of this invention will be evident from the following detailed description of the invention.

SUMMARY OF THE INVENTION

The improved modified resin surfactant of this invention is a water-soluble phenolic-formaldehyde resin containing 1–13 moles of sulfomethylation per 1,000 grams by solids weight of starting resin and further modified by reaction with up to 20 moles, preferably from 2 to 10 moles (per 1,000 grams by solids weight of starting resin), of an agent of the type $X(CHR)_m(CH_2)_nY$, wherein X is a halogen, an activated double bond, epoxy ring or halohydrin, Y is a property group such as sulfonate, phosphonate, carboxylate or hydroxyl, R is another property group such as hydrogen, hydroxyl, mercaptan or amine, and $n$ and $m$ are integers from 0 to 5 with $n$ or $m$ at least 1 to at least partially block the phenolic hydroxyl. The surfactants may be cross-linked to tailor molecular weight and treated with urea or ammonia. These surfactants are useful in dyestuff compositions comprising an admixture of a dye cake, i.e., disperse dyes or vat dyes, and up to 75% by weight of the surfactant of this invention.

DETAILED DESCRIPTION OF THE INVENTION

The surfactants of this invention are modified phenolic-formaldehyde resins. The phenolic-formaldehyde resins which are modified to make the dispersants of this invention are, in general, prepared by reacting a phenol and formaldehyde. Besides phenol, other phenolic-type starting materials may be employed, such as cresol, phenol-cresol mixtures, and resorcinol. For the purpose of this specification phenol will be referred to, but it is understood to include any of the hereinabove-mentioned starting materials.

The type of reactions between formaldehyde and a phenol by way of condensation and/or polymerization is substantially different depending upon whether these reactions are effected in the presence of an alkaline catalyst or in the presence of an acid catalyst. Various catalyst can be utilized including both acids and bases. Alkaline catalysts commonly used for catalyzing the phenol-formaldehyde reaction are the oxides and hydroxides of alkaline earths and alkali metals, ammonia, and amines such as ethanolamine. Acid catalysts commonly used include mineral and organic acids, for example, sulfuric or oxalic acid.

When an alkaline catalyst, such as sodium hydroxide, calcium hydroxide, barium hydroxide and others, are employed, the initial reaction consists primarily in the production of methylol substituents on the benzene ring of the phenol, and the reaction product initially produced is soluble in water and in organic solvents. The reaction product in this condition is referred to as an "A-stage resin." Such alkaline catalyzed products are generally referred to as "resoles." The A-stage resole is soluble in aqueous alkaline solutions. The A-stage resole is the preferred starting resin for preparation of the sulfomethylated phenolic-formaldehyde dispersants of this invention. Further reaction results in polymerization of the methylol phenols to form a product that is insoluble in alkaline solution, and the reaction product in this condition is commonly referred to as being in the "B-stage." Further polymerization at elevated temperatures results in the conversion of the B-stage resin into the thermoset condition in which it normally occurs in manufactured products, this condition being generally referred to as the "C-stage."

As distinguished from the resoles produced by alkaline catalyzed reaction between formaldehyde and a phenol, the presence of an acid catalyst results in a different reaction mechanism, resulting in more highly polymerized reaction products which are commonly referred to in the art as "novolaks." Such novolaks do not possess the solubility in water of the resoles, and are generally utilized by effecting a cure in the presence of a substantial quantity of a curing agent, such as hexamethylene tetramine. In order to use a novolak resin as the starting resin to make the dispersants of this invention, it is adjusted to an alkaline pH.

In a preferred practice of this invention, a phenol and aldehyde mixture are heated in the presence of a catalytic amount of sodium hydroxide and brought to the A-stage. It is conventional in the preparation of the resin to commingle a phenol with an aqueous solution of formaldehyde in the molar ratio desired. For the alkaline catalyzed resins, such molar ratio usually is in the order of 1.0 moles to 3.0 moles of formaldehyde per mole of phenol, preferably 1.3–2.0 moles of formaldehyde per mole of phenol, and for preparing the resole conventional practice is to employ an aqueous formaldehyde solution containing approximately 37% of formaldehyde, paraformaldehyde or other comparable aldehydes. About 0.1 to 15% by weight of sodium hydroxide or other alkaline catalyst is added to the composition for promoting the reaction for forming the A-stage resin. The reaction of phenol and formaldehyde takes place by heating at a temperature between 70° and 150°C. for ½ to 6 hours. By virtue of the water initially included in the reaction mixture and that which is formed during reaction, an A-stage resole as initially produced usually contains approximately 40 to 70% solids. It is to be noted that during this heating some cross-linking will occur with the production of water. Solids content of the starting resin as used herein, denotes the weight of the cross-linked resin obtainable from the resole solution as a percentage of the total weight of the resole solution.

The phenol-formaldehyde resole is modified by adding to it sulfomethylation solubilizing groups. By the term "sulfomethylation" as used herein; it is meant either the sulfonation with sodium sulfite or sulfur dioxide of a hydroxy methyl phenol, or phenol with hydroxy methane sulfonate. The term sulfomethylation thus includes the sulfonation at a carbon atom.

When the phenolic-formaldehyde resins are reacted with the solubilizing group, sulfomethyl groups are introduced into the resin. The amount of sulfomethylated groups may vary from about 1 up to about 13 moles of sulfomethylation per 1,000 grams of wet resin; however, generally only 1 to 6 moles of sulfomethylation are added to get the desired water solubility. It is thought that sulfomethylation occurs primarily in the ortho- or para-position of the phenolic ring.

To sulfomethylate, the phenolic-formaldehyde resin is preferably reacted with formaldehyde or paraformaldehyde or the like and the alkali metal salts of sulfurous acid in an alkaline medium under a wide variety of reaction conditions. Thus, the temperature of the aqueous medium in which the reaction is carried out may be varied considerably. The temperatures need only be sufficient to bring about the introduction of methylol or sulfomethylol groups into the resin. Generally, temperatures between about 30° to 130°C. may be used although temperatures between 90°–95°C. are preferred. Lower temperatures require longer reaction times and in order to complete the reaction within a reasonable time, i.e., 2 to 8 hours, preferably 4 hours, the preferred temperatures are used. Examples of alkali metal salts of sulfurous acid which are useful in this invention include sodium sulfite, potassium sulfite, sodium bisulfite, potassium bisulfite, sodium metabisulfite, potassium metabisulfite and the like. The alkali metal sulfite and bisulfites contain one mole of combined $SO_2$ for each mole of the sulfite. The alkali metal metabisulfites, on the other hand, contain 2 moles of combined $SO_2$ for each mole of the metabisulfite. Accordingly, only one-half molecular proportion of alkali metal metabisulfite is required to a given amount of combined $SO_2$ equivalent to the combined $SO_2$ in one molecular proportion of alkali metal sulfites or bisulfites. The preferred alkali metal salts of sulfurous acid, for the purposes of this invention, are sodium sulfite and sodium metabisulfite.

The amount of the alkali metal salt of sulfurous acid, for example, sodium sulfite, used in relation to the aromatic ring residues in the resin determines the water-solubility of the reaction product formed, it being understood, of course, that formaldehyde is also used with such salt, as described above. Although strictly speaking the formaldehyde and alkali metal salt of sulfurous acid both influence the water-solubility of the final product under acid conditions, the alkali metal salt through introduction of sulfonate groups and the formaldehyde through the formation of methylol groups, the alkali metal salt of sulfurous acid exerts the primary solubilizing influence. The degree of solubility in water of the final product may be varied widely by proper selection of the proportions of the alkali metal salt of sulfurous acid with relation to the aromatic ring residues in the resole. Thus, it is possible to use the sulfurous acid salt in an amount sufficient to provide from 0.5 to 2.0 moles of combined $SO_2$ for each aromatic ring residue (for example, phenol residue) in resin when products having high solubility in water are desired. By decreasing the proportion of the alkali metal salt of sulfurous acid with relation to the aromatic ring residues in the resin, the water-solubility of the product decreases and its salt sensitivity increases. Thus, if the sulfurous acid salt is used in amounts sufficient to provide from about 0.15 to 0.90 moles of combined $SO_2$ for each aromatic ring residue in the resin, excellent dispersing agents are obtained. These agents have sufficient water-solubility to be soluble in water which is acidic, neutral and alkaline. If the mole ratio of combined $SO_2$ in the sulfurous acid salt to aromatic ring residues in the resin is appreciably below 0.1, the products are substantially insoluble in neutral or acidic aqueous media.

The molecular proportions of formaldehyde, either as formalin, or as paraformaldehyde, and the alkali metal salt of sulfurous acid may be varied widely with relation to each other and also with relation to the aromatic ring residues in the resin depending on the properties desired in the dispersant. For most purposes, the mole ratio of formaldehyde to the alkali metal salt of sulfurous acid is preferably at least one mole of formaldehyde for each mole of combined $SO_2$ in the alkali metal salt. If less formaldehyde is used, an excess of the alkali metal salt of sulfurous acid remains in the reaction mixtures and does not take part in the reaction. Hence, the solids concentration of the reaction mixture is increased without any corresponding benefit. Moreover, if the reaction mixture is neutralized at the end of the reaction, as is usually the case, more acid is required to neutralize the reaction mixture. Consequently, more salt is formed and the solids content of the final product is increased without any corresponding benefit in the properties of the end product. When it is desired to cross-link the resin to the maximum possible extent, it is possible to increase the amount of formaldehyde substantially. In such a case, the mole ratio of formaldehyde to combined $SO_2$ in the alkali metal salt of sulfurous acid may be as high as 25:1.

The pH of the reaction mixture will vary considerably depending on the particular alkali metal salt of sulfurous acid used. Thus, with sodium sulfite the pH will be higher initially than in the case where sodium bisulfite or sodium metabisulfite is used. Moreover, since sodium hydroxide is liberated during the reaction when sodium sulfite is used and is not liberated in those instances when sodium bisulfite or sodium metabisulfite is employed, the reaction mixture at the completion of the reaction will have a higher pH when sodium sulfite is used. The alkalinity of the reaction mixture is normally derived from the alkali metal salt of the sulfurous acid and it is not necessary to add alkali for this purpose, especially when the amount of the alkali metal salt of sulfurous acid used is sufficient to neutralize the acidity of the resin and the formalin solution. If the amount of the alkali metal salt of sulfurous acid employed is not sufficient for such neutralization a small amount of an alkali metal hydroxide is added to make the reaction mixture slightly alkaline. When sodium sulfite is used, the sulfomethylated phenolic-formaldehyde resin generally has a final pH of between 9.5 and 12.0.

Since free formaldehyde and methylol groups are present, at least during the initial stages of the sulfomethylation reaction, a certain amount of cross-linking of the resin takes place resulting in increased molecular weight. In dye dispersants, increased molecular weight is desirable up to a point to produce desirable dispersant properties. Additional amounts of formaldehyde, say 0.2 to 1.0 moles of formaldehyde per 1,000 grams of sulfomethylated resin, may be used to effect cross-linking. Also heating, at say 90°C., for 1-3 hours promotes the formaldehyde cross-linking which does not block the phenolic hydroxyl. Formaldehyde, for instance, is an effective cross-linking agent; whereas, epicholorohydrin is less effective. It should also be pointed out that too high a molecular weight, i.e., over 30,000, of the sulfomethylated resin is undesirable. For the purposes of this specification the term "low molecular weight" refers to dispersants having a molecular weight less than 500; and "high molecular weight" refers to dispersants having a molecular weight more than 15,000. Dispersants having a molecular weight between 2,000 and 20,000 are preferred.

After sulfomethylation of the resin and cross-linking is effected to the desired level, an alkaline mixture or solution is obtained which may be used as such or neutralized with an acid or made acidic. If the solution is neutralized or made acidic, it is preferably cooled prior to the addition of acid to avoid high temperatures caused by the heat of neutralization of alkali in the mixture. In the preparation of the dispersants of this invention, the pH of the final solution is usually lowered with a mineral acid, such as sulfuric acid preferably together with an organic acid, such as glycolic acid or acetic acid, as a buffering agent. In such instances the final pH of the solution is normally adjusted between about 6 and 10. When a minimum amount of water is used in the reaction mixture, the final solution is quite viscous. Such solutions may be diluted with water to increase their pumpability either before or after they are neutralized.

It may be desirable to react the sulfomethylated, cross-linked, phenolic-formaldehyde resin with urea or ammonia after blocking is completed. This reaction allows a greater amount of sulfomethylation to be effective by deactivating unreacted methylol groups, while still maintaining good heat stability. Generally, 0.5 to 7.5 moles of ammonia or urea per 1,000 grams of cross-linked, sulfomethylated resin is used at a temperature between 80° and 150°C. for from 5 minutes to 1 hour.

When products which are soluble in water under acid conditions are desired, it is important to use sufficient water in the reaction mixture to dissolve all of the reagents and the final product, otherwise the reaction does not proceed as rapidly as is desired and various difficulties are encountered. When the final solution is to be shipped, it is usually desriable to use the minimum amount of water in the reaction mixture.

The phenolic-formaldehyde resins are further modified by reaction with from up to 20 moles, preferably from 2 to 10 moles, per 1,000 grams by solids weight of starting resin with an agent of the type $X(CHR)_m(CH_2)_nY$, wherein X is a halogen, an activated double bond, epoxy ring or halohydrin, Y is a property group such as an alkane sulfonate, phosphonate, carboxylate or hydroxyl, R is another property group such as hydrogen, hydroxyl, mercaptan, or amine; and n and m are integers from 0 to 5 and n or m is at least 1 to at least partially block the phenolic hydroxyl. The reaction of the resin with any of the reactants serves primarily to lower the phenolic hydroxyl content of the resin. Depending upon the starting resin the acid hydroxyl content begins to be blocked by small amounts of reactant per 1,000 grams of resin and can be reduced to substantially zero.

Examples of the blocking agents contemplated with the type exemplified by $X(CH_2R)_m(CH_2)_nY$, when $m$ is 0, include for example, ethylene oxide, propylene oxide, chloromethanesulfonate, chloromethanephosphonate, 2-chloroethanol, 2-bromoethanol and acrolein, among others. When $m$ is 1 or more, blocking agents include, for example, 1-chloro-2-hydroxyethane phosphonate and acrylamide. When X is a halohydrin specific blocking agents include for example, 3-chloro-2-hydroxypropane phosphonate, 3-chloro-1, 2-dihydroxypropane, and 3-chloro-2-hydroxypropane sulfonate, when Y is a phosphonate or hydroxyl respectively, R is a hydrogen, $m$ is 1 and $n$ is 0. More than one blocking agent may be used in the same reaction to form the blocked resin. For example, epichlorohydrin and 3-chloro-2-hydroxypropane sulfonate may be reacted at the same time with the sulfomethylated resin to tailor an end product having particular properties.

It should also be pointed out that particularly good results are obtained when two or more dispersants are mixed together.

The blocked resins are made by simply dissolving the starting resin in water and intermixing a given amount of blocking agent and reacting at a temperature between about 10° and 200°C. with the time depending upon the temperature used and the degree of reaction desired. Typically, the blocked resin is neutralized, allowed to cool and then dried. A catalyst, such as sodium hydroxide may be used if desired but is not necessary.

The surfactants of this invention are particularly useful as dispersants with disperse dyes or vat dyes in either the dry or liquid form. The blocked resins may be added to the dye cake before, during or after grinding. For most dyeing applications a surfactant having 1 to 6 moles of blocking agent per 1,000 grams of starting resin is used. It is generally preferred to add the surfactant prior to grinding so that it will be thoroughly mixed and aid in particle size reduction. The amount of blocked resin dispersant added to a dye will vary widely, depending upon the particular dye cake, the materials to be dyed and the effect desired. Amounts up to 75% of the blocked resin dispersant, based upon the weight of dried dye cake may be used. The most important factor in determining the proper amount of blocked resin to the used in making up the dyestuff is the particular dye cake used. Generally this amount will vary from dye to dye.

Dyestuff compositions comprise, for the most part, a dye cake, i.e., disperse dyes or vat dyes, and a dispersant. These dyestuff compositions are widely used to color both natural and synthetic fibers. The dye dispersants that may be used to disperse the dye cake vary widely in method of manufacture and source. In the dyestuff composition the dispersant serves three basic functions. It assists in reducing the dye particle to a fine size, it maintains a dispersing medium and it is used as an inexpensive diluent. Generally, dye dispersants are of two major types, one of those being sulfonated lignins from the wood pulping industry via the sulfite or kraft process, the other being a water soluble aromatic, i.e., napthalene sulfonate, from the petroleum industry. The disadvantages of sulfonated lignins include fiber staining, reduction if diazo type dyes, dark brown color and a tendency to stabilize foams.

Fiber staining by the lignin occurs mainly on cellulosic and nitrogenous fibers such as cotton, nylon and wool; polyester fibers are also stained but to a lesser extent. A second disadvantage of sulfonated lignin dispersants has been that when dyeing with diazo-type dyes under high temperature and pressure dyeing processes, the oxidizable lignin structures tend to reduce the diazo dye linkage. Another disadvantage is the brown color. Lastly, foam stabilization properties are troublesome for several reasons.

The advantages that water-soluble lignin dispersants possess over other dispersants include the ability to impart better heat stability to the dye dispersion, and to disperse with equal effectiveness. Another advantage of a water-soluble lignin dispersant is that it tends to act as a dye retarder. Some dyes have a tendency to start dyeing at very low temperatures. Dyers prefer colors to dye a fiber at a steady rate proportional to temperature increase. If the color dyes too rapidly, the goods take on a streaky appearance; and creases in the material dye more rapidly than the face of the cloth.

The dispersants described herein possess excellent dispersion properties, low color, no azo dye reduction tendencies, no fiber staining properties and low viscosities at high solids contents.

As stated earlier, these modified water soluble resins are particularly useful dispersants (dyestuffs, pigments, etc.), as metal complexing agents (cement, nuclei growth control, water purification) and as emulsion stabilizers (asphalt, chemical impurities in dyestuffs, dyestuff carriers, etc.).

The practice of this invention may clearly be seen in the following examples.

EXAMPLE 1

This example illustrates a preferred process for making the sulfomethylated phenolic-formaldehyde resin used to make the dispersants of this invention.

A resole resin was prepared by condensing 1 to 1.3 molar portions of phenol to formaldehyde in the presence of a sodium hydroxide catalyst. The reaction was carried out at about 70°C. until the resin reached the A-stage. The A-stage resin had a solids content of 59.4% and a pH of 8.8 with a major portion of the resin having a molecular weight of between 125 and 1,800. To a 1 gallon reactor kettle, 1512 grams of the resin were charged. To this was added 600 grams of reagent grade $Na_2SO_3$, 1200 grams water and 372 grams of 37% formaldehyde. The contents were continuously stirred and heated to 90°–95°C. for 4 hours to effect sulfomethylation. The pH of this reaction, 10 minutes after heating was discontinued, was 10.3

EXAMPLE 2

Samples of the sulfomethylated phenolic-formaldehyde resin of Example 1 were reacted with ethylene oxide to make a resin in which the phenolic hydroxyl groups are blocked. The conditions used were as follows. The pH of the sulfomethylated resin (1,000 grams) was lowered to 9.5 with acetic acid (47 grams) and placed in a 2 liter stainless steel bomb and the entire contents frozen. Liquid ethylene oxide (47 grams) was added to the bomb, after purging with nitrogen, and the bomb capped and heated to 90°C. The pressure rose to approximately 3 atmospheres and then fell to zero soon after the 90°C. temperature was reached. The heating was discontinued after 30 minutes at 90°C. Upon removing from the bomb the pH was 11.7. The process was repeated in order to add more ethylene oxide to the resin. In order to keep hydrolysis of the ethylene oxide to a minimum, the multistage addition was used. When all the ethylene oxide desired (usually between 1 and 6 moles) was added the pH was lowered to 8.5 and 30 grams of urea were added. After 10–30 minutes at 90°C., 20 grams of boric acid were added and the final pH adjusted to 8.0 with acetic acid if necessary.

TABLE 1

| Run No. | Maximum Possible Blocking | Moles EO/ 1000 grams wet resin |
|---|---|---|
| 2 | 1 | 1 |
| 3 | 2 | 2 |
| 4 | 3 | 3 |
| 5 | 4.5 | 4.5 |

EXAMPLE 3

Samples of the sulfomethylated phenolic-formaldehyde resin of Example 1 were reacted with varying ratios and amounts of epichlorohydrin and 3-chloro-2-hydroxypropane sulfonate (CHP) to make a resin in which the phenolic hydroxyl groups are blocked. The conditions used in the synthesis of these compounds are as follows. The CHP was added to the resin (1,000 grams) to lower the pH to 9.5 (if the amount of CHP to be added was not sufficient to lower the pH to 9.5 acetic acid was used). Water in the equivalent amount as the total CHP and epichlorohydrin to be used was added to the reaction solution and the mixture was heated to 80°C. under stirring. The epichlorohydrin was then added over a 5 to 10 minute period. The rest of the CHP was then added and the pH adjusted between 9.5 and 10.0 with 50% sodium hydroxide solution. The mixture was stirred and kept at 80°C. for 30 minutes and then heated to 90°C. and reacted for 60 minutes. At the end of the reaction period the pH was dropped with acetic acid to 8.5 and 30 grams urea were added. After 10 minutes at 90°C., 20 grams of boric acid were added and the final pH adjusted to 8.0 with acetic acid if necessary.

TABLE II

| Run No. | Maximum Blocking Possible | Moles/1000 grams wet resin (Example 1) | |
|---|---|---|---|
| | | CHP | epichlorohydrin |
| 6 | 5.0 | 0 | 2.5 |
| 7 | 2.5 | 2.5 | 0 |
| 8 | 3.0 | 2.0 | 0.5 |
| 9 | 3.5 | 1.5 | 1.0 |
| 10 | 3.0 | 1.5 | 0.75 |

EXAMPLE 4

To illustrate other blocking agents, a number of other products were prepared and tested as disperse dye dispersing agents (Table IV). Some of these products are shown in the following table. They were typically prepared using conditions similar to those given in Examples 2 and 3, except that higher temperatures and pressures were needed in runs 23–25 in order to get reaction to occur.

TABLE III

| Run No. | Blocking Additive | Moles of Additive/ 1000 grams wet resin (Example 1) |
|---|---|---|
| 11 | propylene oxide | 3 |
| 12 | do. | 4.5 |
| 13 | 2-chloroethanol | 1 |
| 14 | do. | 2 |
| 15 | do. | 3 |
| 16 | do. | 4 |
| 17 | do. | 6 |
| 18 | do. | 10 |
| 19 | chloroacetic acid | 0.6 |
| 20 | do. | 1.2 |
| 21 | do. | 2.0 |
| 22 | do. | 6.0 |
| 23 | chloromethane phosphonate | 1.0 |
| 24 | do. | 3.0 |
| 25 | chloromethane sulfonate | 3.0 |

EXAMPLE 5

In order to clearly illustrate the advantages in physical properties obtained by the dispersants of this invention they were tested as disperse dyestuff dispersants. These tests were conducted according to the test procedures outlined below.

A standard diazo disperse dye paste was prepared by adding Disperse Brown 1, C.I. 21,000, (50 grams dry crude), dispersing agent (35 grams on dry solids basis) and water (to 40% solids) to a 1 quart ball mill. After milling one gram of solids material (2.5 grams liquid basis) was mixed with 250 milliliters of tap water and poured through a Bückner funnel containing a tared, 9.0 cm., No. 4 Whatman filter paper (with vacuum). The paper was washed with 300 milliliters of tap water (120° to 140°F.), dried, weighed and the residual dye material left on the fitter calculated. If residual materials is less than 0.01 grams the dispersion is called excellent, between 0.01 and 0.05 grams the dispersion is considered good, and anything above 0.05 grams residual is considered poor.

A thermosol test was also run to determine fiber staining. This procedure involves padding a 65/35: dacron/cotton checkered cloth with a 60 g/l dispersant solution. The cloth is then dried and thermosoled at 210°C. for 90 seconds. The cloth is then treated with a caustic-dithionite solution (100°C.-30 sec.) and then oxidized in a sodium perborate solution (10 minutes at 50°C.). The cloth is then scoured in dilute soda ash (1 g/l) with a surfactant for 5 minutes at 100°C. Finally the cloth is rinsed and dried at 105°C. The cotton was found to be more sensitive to stain than the polyester and results are described in terms of stain on cotton fiber.

The test to determine the color value of the dispersant involves measuring the absorption of a pH 6.0 dispersant solution at 280 and 500 nm and then calculating an $\epsilon_{500}$ value.

The diazon dye reduction test was performed by charging a pressure bomb with 500 mg of C.I. 21,000, Disperse Brown 1 dye, 200 cc water, and 20 grams of sulfonated dispersant. The mixture was thoroughly stirred and the pH adjusted to between 5 and 6 with acetic acid. A 10 gram nylon skein was placed in the dye mixture, the bomb sealed and heated to 130°C. for 1 hour. After cooling, the skein was removed from the bomb, washed, dried and compared visually to a skein which had been similarly treated except the sulfonated dispersant was omitted. If desired the reduction in color can be determined spectrometrically on the residual solution.

TABLE IV

| Run No. | Blocking Agent and moles/1000 grams of Run No. 1 | Dispersion Results[a] | Fiber Staining[b] | Diazo Dye Reduction[c] | Color Value |
|---|---|---|---|---|---|
| 1[d] | no blocking | 1 | 4 | 3 | 0.01 |
| 2 | ethylene oxide - 1 | 1 | 4 | — | 0.0075 |
| 3 | ethylene oxide - 2 | 1 | 3 | — | 0.0055 |
| 4 | ethylene oxide - 3 | 1 | 2 | — | 0.0035 |
| 5 | ethylene oxide - 4.5 | 2 | 1 | — | 0.0060 |
| 6 | CHP - epi" 0:2.5 | 2 | 1 | 1 | 0.0025 |
| 7 | CHP - epi" 2.5:0 | 1 | 1 | 2 | 0.0085 |
| 8 | CHP - epi" 2.0:0.5 | 1 | 1 | — | 0.0050 |
| 9 | CHP - epi" 1.5:1.0 | 1 | 1 | 1 | — |
| 10 | CHP - epi" 1.5:0.75 | 1 | 1 | — | 0.0070 |
| 12 | propylene oxide 4.5 | 1 | — | — | — |
| 13 | 2-chloroethanol 1 | 1 | — | — | — |
| 14 | 2-chloroethanol 2 | 1 | — | — | — |
| 16 | 2-chloroethanol 4 | 1 | 1 | — | 0.0065 |
| 17 | 2-chloroethanol 6 | 2 | — | — | — |
| 18 | 2-chloroethanol 10 | 3 | — | — | — |
| 20 | chloroacetic acid 1.2 | 1 | — | — | — |
| 21 | chloroacetic acid 2.0 | 1 | 3 | — | — |
| 22 | chloroacetic acid 6.0 | 2 | 1 | — | — |
| Reax 85A[f] | | 1 | 3 | 4 | 1.9 |

TABLE IV—Continued

| Run No. | Blocking Agent and moles/1000 grams of Run No. 1 | Dispersion Results[a] | Fiber Staining[b] | Diazo Dye Reduction[c] | Color Value |
|---------|---------------------------------------------------|------------------------|--------------------|-------------------------|-------------|

Notes:
[a] 1 - indicates excellent dispersion, 5 indicates poor dispersion
[b] 1 - indicates no fiber staining, 5 indicates a great deal of fiber staining.
[c] 1 - indicates no azo dye reduction, 5 indicates a great deal of azo dye reduction.
[d] Product produced in Example 1 plus addition of urea (3g/100g wet resin) and boric acid (2g/100g wet resin).
[e] CHP is 3-chloro-2-hydroxypropane sulfonate and epi is epichlorohydrin. Runs 8–10 are combinations of these products while 6 is epi alone and 7 is CHP alone.
[f] Reax 85A is a commercial disperse dye dispersant made of lignin.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. Reaction products of sulfomethylated phenolic-formaldehyde resins having molecular weights between about 500 and 30,000, and 0.25 moles to 20 moles per 1,000 grams of said resins of chloromethane sulfonate, to give resin adducts with the phenolic hydroxyl at least partially blocked.

2. The product of claim 1 wherein said resin is reacted with from 1 to 10 moles of said chloromethane sulfonate per 1,000 grams of resin.

3. The product of claim 1 wherein said resin contains from 1 to 13 moles of sulfonation per 1,000 grams of resin.

4. Reaction products of sulfomethylated phenolic formaldehyde and 0.25 moles to 20 moles per 1,000 grams of said resin of an agent of the type $X(CHR)_m(CH_2)_nY$, wherein X is a halogen, a halohydrin group, an activated double bond or an epoxide group, Y is a sulfonate, carboxylate, phosphonate or hydroxyl, R is a hydroxyl, mercaptan, amine or hydrogen, and $n$ and $m$ are integers from 0 to 5 with $m$ and $n$ together being at least 1, to give resin adducts with the phenolic hydroxyl at least partially blocked.

5. The product of claim 4 wherein said resin is reacted with from 1 to 10 moles of said agent per 1,000 grams of resin.

6. The product of claim 4 wherein said resin contains from 1 to 13 moles of sulfomethylation.

7. The product of claim 4 wherein said agent is chloroacetic acid.

8. The product of claim 4 wherein said agent is 3-chloro-2-hydroxypropane-sulfonate.

9. The product of claim 4 wherein said agent is ethylene oxide.

10. The product of claim 4 wherein said agent is 2-chloroethanol.

11. The product of claim 4 wherein said agent is propylene oxide.

12. The product of claim 4 wherein said agent is epichlorohydrin.

13. The product of claim 4 wherein said reaction product is formed by reacting more than one of said agents.

14. The products of claim 1 wherein said sulfomethylated phenolic-formaldehyde resins have molecular weights between about 2,000 and about 20,000.

15. The products of claim 1 wherein said resins are reacted with said chloromethane sulfonate at a temperature between 10° and 200°C.

* * * * *